United States Patent
Finnerty et al.

(10) Patent No.: US 11,665,167 B2
(45) Date of Patent: May 30, 2023

(54) DYNAMICALLY DEPLOYED LIMITED ACCESS INTERFACE TO COMPUTATIONAL RESOURCES

(71) Applicant: Telefonaktiebolaget LM Ericsson (publ), Stockholm (SE)

(72) Inventors: Tony Finnerty, Westmeath (IE); Michael Behan, Westmeath (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 249 days.

(21) Appl. No.: 16/757,473

(22) PCT Filed: Oct. 23, 2017

(86) PCT No.: PCT/EP2017/077040
§ 371 (c)(1),
(2) Date: Apr. 20, 2020

(87) PCT Pub. No.: WO2019/080993
PCT Pub. Date: May 2, 2019

(65) Prior Publication Data
US 2021/0194881 A1     Jun. 24, 2021

(51) Int. Cl.
*H04L 9/40* (2022.01)

(52) U.S. Cl.
CPC .......... *H04L 63/101* (2013.01); *H04L 63/102* (2013.01); *H04L 63/105* (2013.01); *H04L 63/20* (2013.01)

(58) Field of Classification Search
CPC .... H04L 63/101; H04L 63/102; H04L 63/105
(Continued)

(56) References Cited

U.S. PATENT DOCUMENTS

| | | | |
|---|---|---|---|
| 7,870,270 B1* | 1/2011 | Singh | G06F 16/24552 709/224 |
| 2008/0136828 A1 | 6/2008 | Chang | |

(Continued)

FOREIGN PATENT DOCUMENTS

| | | |
|---|---|---|
| CN | 101034990 A | 9/2007 |
| CN | 101106572 A | 1/2008 |
| CN | 102968599 A | 3/2013 |

OTHER PUBLICATIONS

PCT Notification of Transmittal of the International Search Report and the Written Opinion of the International Searching Authority, or the Declaration issued for International application No. PCT/EP2017/077040—dated May 23, 2018.

(Continued)

*Primary Examiner* — Anthony D Brown
(74) *Attorney, Agent, or Firm* — Baker Botts L.L.P.

(57) ABSTRACT

A first access interface (100) of a an access control system provides access to computational resources (150). At least one access role of a user and at least one access target associated with the access role of the user are determined. Based on the at least one access role of the user and the associated at least one access target, a subset of the computational resources (150) is determined. A second access interface (110, 120) is defined which is limited to the subset of the computational resources (150). Through the second access interface (110, 120) the user is provided with access to the subset of the computational resources (150).

18 Claims, 6 Drawing Sheets

(58) Field of Classification Search
USPC .......................................................... 726/27
See application file for complete search history.

(56) References Cited

U.S. PATENT DOCUMENTS

| 2013/0029641 | A1  | 1/2013 | Hickie |
| 2015/0058920 | A1  | 2/2015 | Burghart |
| 2015/0256557 | A1* | 9/2015 | Wong ...................... H04L 63/20 726/6 |

OTHER PUBLICATIONS

Chinese Office Action issued for Application No. 201780096233.8—dated Feb. 9, 2022.

* cited by examiner

DYNAMICALLY DEPLOYED LIMITED ACCESS INTERFACE TO COMPUTATIONAL RESOURCES

PRIORITY

This nonprovisional application is a U.S. National Stage Filing under 35 U.S.C. § 371 of International Patent Application Serial No. PCT/EP2017/077040 filed Oct. 23, 2017 and entitled "Dynamically Deployed Limited Access Interface to Computational Resources" which is hereby incorporated by reference in its entirety.

TECHNICAL FIELD

The present invention relates to methods for controlling access to computational resources and to corresponding devices and systems.

BACKGROUND

In computer systems or networks it is known to provide various mechanisms for controlling access of users to computational resources. One example is access control in a communications network. In this case, it may need to be controlled which resources of the communication network can be used by a certain subscriber. However, access control may also be needed with respect to management of the communications network. For example, a communications network may share its network resources among multiple operators, and each operator may need to manage a corresponding share of network resources.

In each case, access control involves that a certain user, in the above-mentioned examples a certain subscriber or operator, is granted access to certain computational resources while access to other computational resources is denied for this user. Similarly, access control may also involve that for a certain computational resource, access is granted to a certain user, while for another user access is denied. Accordingly, access control may consider various dimensions by granting access to the computational resources depending on the user and/or depending on the computational resources to be accessed.

One way to consider perform access control in a user dependent manner is to assign roles to the users and perform access control depending on the role assigned to a certain user. This is typically referred to as Role Based Access Control (RBAC). Here, a role may define transactions which are permitted or forbidden on computational resources. Multiple users may be assigned the same role, and one or more roles may be assigned to each user. In a multi-dimensional access control scheme, the RBAC may be combined with Target Based Access Control (TBAC) by considering also a target of the access in the decision. The target of the access may be defined in terms of a set of computational resources required for a transaction. However, implementing fine-grained multi-dimensional access control may be difficult without adversely affecting performance of the access control system. When fine-grained multi-dimensional access control is implemented in services space, this can lead to inconsistent coverage of services and/or may result in architectural duplication because similar access control mechanisms may need to be implemented individually for each service. Further, there may also be increased load on data repositories as more data than actually for an access control decision is obtained from data repositories and then post-processed in the services space.

Accordingly, there may be an excessive overhead in the data obtained from the data repositories. When fine-grained access control in turn is multi-dimensional in data repositories, this can result in an excessive processing overhead as access is checked in the data repository. This may lead to choking of throughput.

Accordingly, there is a need for techniques which allow for efficient role- and target-based access control.

SUMMARY

According to an embodiment of the invention, a method of controlling access to computational resources. The method comprises providing access to computational resources through a first access interface. Further the method involves determining at least one access role of a user and at least one access target associated with the access role of the user. Based on the at least one access role of the user and the associated at least one access target, a subset of the computational resources is determined. Further, the method comprises defining a second access interface, which is limited to the subset of the computational resources. Further, the method comprises providing the user with access to the subset of computational resources through the second access interface.

According to a further embodiment of the invention, an access manager is provided. The access manager is configured to provide access to computational resources through a first access interface. Further, the access manager is configured to determine at least one access role of a user and at least one access target associated with the access role of the user. Further, the access manager is configured to determine a subset of the computational resources based on the at least one access role of the user and the associated at least one access target. Further, the access manager is configured to define a second access interface, which is limited to the subset of computational resources. Further, the access manager is configured to provide the user with access to the subset of computational resources through the second access interface.

According to a further embodiment of the invention, a device is provided. The device comprises at least one processor and a memory containing instructions executable by the at least one processor, whereby the device is operative to: provide access to computational resources through a first access interface; determine at least one access role of a user and at least one access target associated with the access role of the user; based on the at least one access role of the user and the associated at least one access target, determine a subset of the computational resources; define a second access interface, which is limited to the subset of computational resources; and provide the user with access to the subset of the computational resources through the second access interface.

According to a further embodiment of the invention, an access manager is provided. The access manager comprises a module for providing access to computational resources through a first access interface. Further, the access manager comprises a module for determining at least one access role of a user and at least one access target associated with the access role of the user. Further, the access manager comprises a module for determining, based on the at least one access role of the user and the associated at least one access target, a subset of the computational resources. Further, the access manager comprises a module for defining a second access interface which is limited to the subset of computational resources. Further, the access manager comprises a module for providing the user with access to the subset of the computational resources through the second access interface.

According to a further embodiment of the invention, a system is provided. The system comprises an access manager. The access manager is configured to provide access to computational resources through a first access interface. Further, the access manager is configured to determine at least one access role of a user and at least one access target associated with the access role of the user. Further, the access manager is configured to determine a subset of the computational resources based on the at least one access role of the user and the associated at least one access target. Further, the access manager is configured to define a second access interface, which is limited to the subset of computational resources. Further, the access manager is configured to provide the user with access to the subset of computational resources through the second access interface. Further, the system further comprises a device configured to provide the second access interface.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to control of access to computational resources. More specifically, embodiments will be described which involve access control in management of a multi-tenant communications network, i.e., a communications network in which network resources are shared by multiple customers, also referred to as tenants. Here, the access control involves controlling which management transactions are permitted for a certain tenant and controlling to which network elements such management transactions may be applied. However, it is noted that the illustrated concepts could also be applied in other scenarios, e.g., for controlling access of subscribers to services, or the like.

In the illustrated examples, the access control may enable management of network resources by multiple customer, using a single network management system and database. In this context, the access control mechanisms may be used to prevent one customer from gaining access to another customer's resources or data. Although the examples further illustrated below refer to a scenario with two customers, it is noted that in practice larger numbers of customers, e.g., 30 or more, may be supported by the network management system.

In the illustrated concepts, the access control mechanisms are based on a combination of RBAC and TBAC for each network management function. Such network management functions may for example include content management, fault management, performance management, security management, automation management, or the like. The RBAC involves assigning roles to different users of the network management system. Such user may for example be an administrator. The roles may be used for distinguishing between users associated with different customers. Further, the roles may also be used for distinguishing between different user types, e.g., between a security administrator and an performance or fault analyst. The TBAC involves associating access targets with the roles, so that it becomes possible to also control which network resources or elements are exposed to the user. The access targets define a part of the computational resources which are potentially subject to an access by the user.

Figure 1:
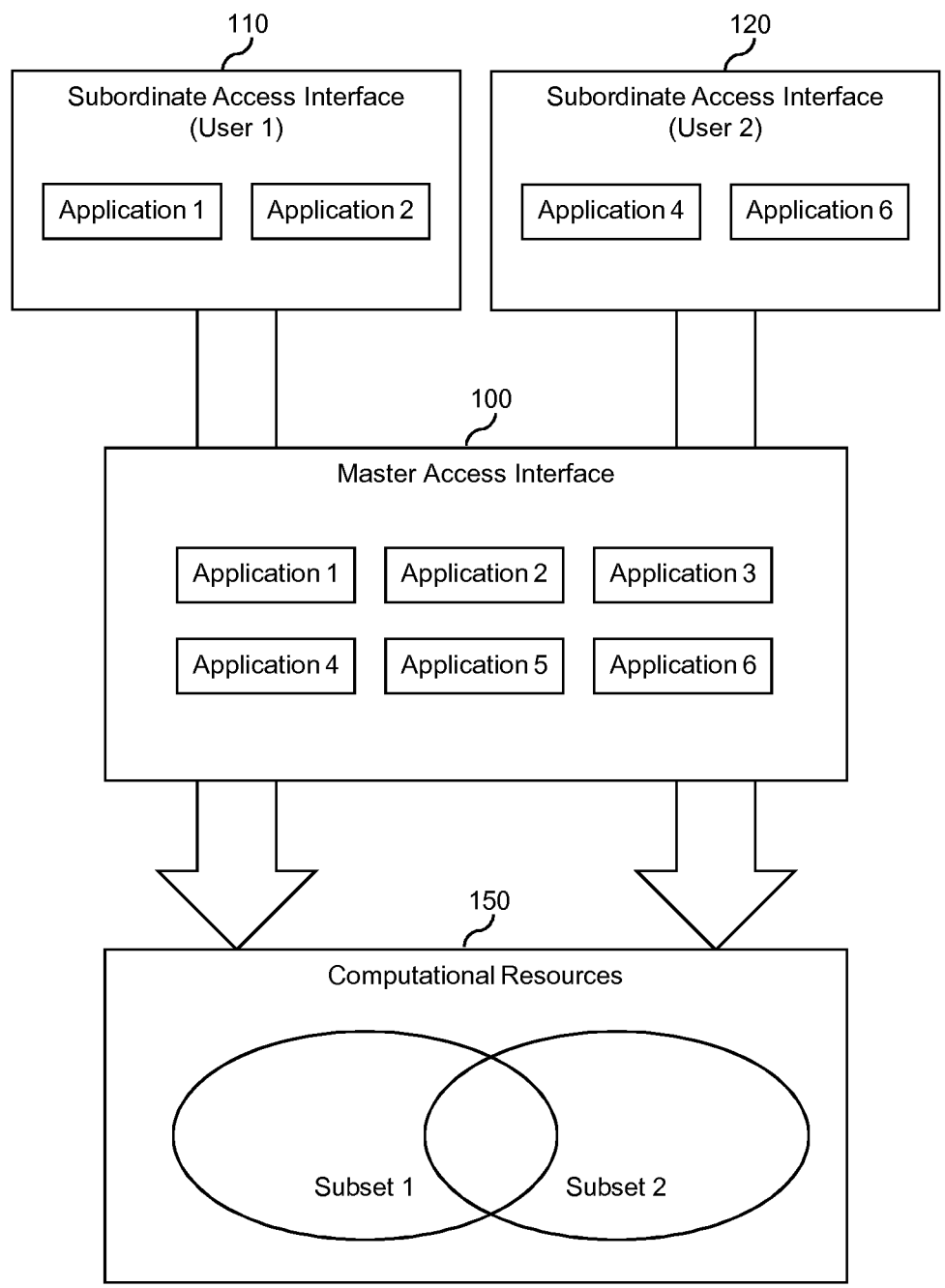
FIG. 1 schematically illustrates organization of access interfaces according to an embodiment of the invention.

FIG. 1 schematically illustrates organization of access interfaces which may be used in the network management system. As illustrated a master interface 100 provides access to computational resources 150. The computational resources may for example include physical and/or virtualized network elements, e.g., servers, gateways, routers, switches, access points, control nodes, or the like. The master interface 100 provides multiple applications, e.g., management applications relating to different management functions, such as content management, fault management, performance management, security management, automation management, or the like. Further, the network management system provides a first subordinate access interface 110 for a first user (user 1) and a second subordinate access interface 120 fora second user (user 2). Accesses to the computational resources 150 through the subordinate access interfaces are mediated by the master access interface 100. Accordingly, the master access interface 100 and the subordinate access interfaces 110, 120 are organized in a hierarchical manner.

The subordinate access interfaces 110, 120 are tailored to the respective user. In the illustrated example this involves that the subordinate access interfaces 110, 120 do not provide all applications of the master interface 100, but only a subset of the applications. The applications provided by the subordinate access interface 110, 120 may for example be selected according to the role of the respective user. For example, a role access control policy may be used as a basis for selecting the applications provided by the subordinate access interface 110, 120.

Further, the subordinate access interfaces 110, 120 are also limited with respect to the computational resources to be accessed by the user. As illustrated, the computational resources include a first subset and a second subset. The first subordinate access interface 110 exposes only the computational resources of the first subset. The second subordinate access interface 120 exposes only the computational resources of the second subset. In the illustrated multi-tenancy scenario, this allows for avoiding that computational resources assigned to a certain tenant are exposed to another tenant. A target access control policy may be used as a basis for selecting the computational resources exposed by the subordinate access interface 110, 120. As illustrated in FIG. 1, there may also be an overlap of computational resources of the first subset and the second subset. The computational resources of this overlap region would be exposed by both subordinate access interfaces 110, 120.

Figure 2:
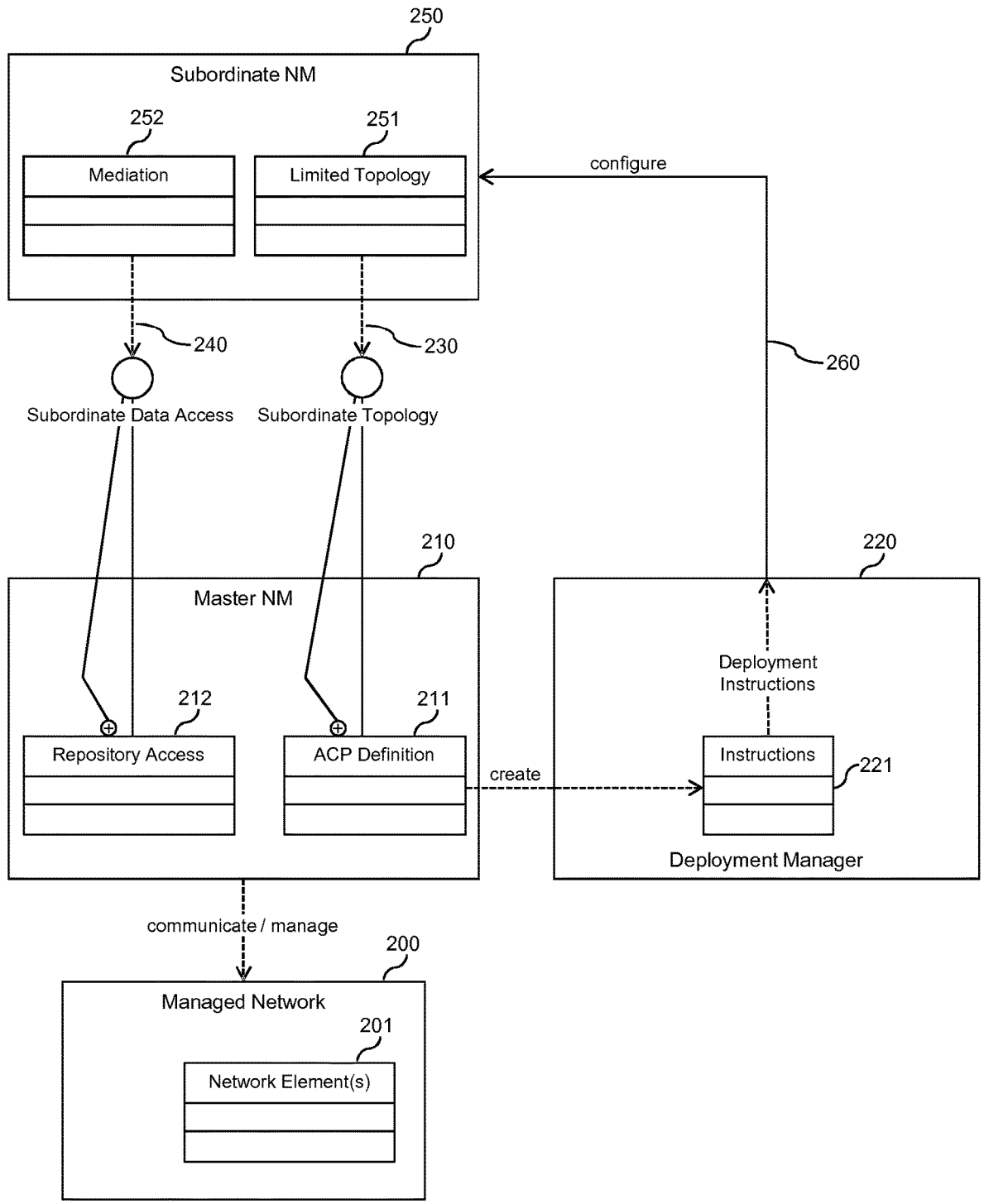
FIG. 2 schematically illustrates elements a system for management of a multi-tenant communications network.

FIG. 2 schematically illustrates elements of the network management system. As illustrated, the network management system includes a master network manager (Master NM) 210, a deployment manager 220, and a subordinate network manager (Subordinate NM) 250. Further, FIG. 2 also illustrates the managed network 200 and one or more network elements 201 of the managed network 200. For implementing various management functions, the master network manager 210 communicates with the network element(s) of the managed network 200. The subordinate network manager 250 implements a limited set of management functions by interacting with the master network manager 210. The deployment manager 220 is used for dynamically configuring the subordinate network manager 250. This is accomplished based on access control policies (ACPs) 211 defined in the master network manager 210. The master network manager 210 may provide the above-mentioned master access interface 100 and the subordinate network manager 250 may provide one of the above-mentioned subordinate access interfaces 110, 120.

The subordinate network manager 250 interacts through a topology interface 230 and a database interface 240 with the master network manager 210. The topology interface 230 is used to provide the subordinate network manager 250 with information on the computational resources to be exposed to a user of the subordinate network manager 250, e.g., in terms of one or more limited topology models 251 of network elements to be managed through the subordinate network manager 250, in the following also referred to as target models. The database interface 240 is used to provide the subordinate network manager 250 with a replicate of data relating to the target models. This is achieved by interaction of a mediation application 252 of the subordinate network manager 250 with a data repository 212 of the master network manager 210. The subordinate network manager 250 may use a key provided as part of its provisioning to request the topology information from the master network manager 210. Only topology information related to the target models associated with the user or role(s) of the user is added. Updates to target model definitions may be pushed as notifications to the subordinate network manager 250.

For configuring the subordinate network manager 250, the deployment manager 220 provides deployment instructions 221 to the subordinate network manager 250. This is accomplished through a deployment interface 260 between the deployment manager 220 and the subordinate network manager 250. As illustrated, the deployment instructions 221 are created dynamically based on the ACPs defined in the master network manager 210. The deployment manager 220 may for example use a container-based deployment platform like Docker or Kubernetes for configuring the subordinate network manager 250. By use of the deployment manager 220, the subordinate network manager 250 can be dimensioned and otherwise configured according to the responsibility of the user or the management role(s) of the user. Accordingly, a lightweight deployment of the subordinate network manager 250 can be obtained. Applications which are not needed for the management role(s) of the user do not need to be supported by the subordinate network manager 250.

The management system may operate as follows: Initially, management targets may be defined and assigned to management roles. This may be accomplished on the master network manager 210. The management roles and management targets may then be translated into the limited target models, a list of required management applications, and a launcher configuration. The limited target models and the list of management applications define a scope of management functions provided to the user of the subordinate network manager 250. The target models may be annotated with attributes. In this way, it becomes possible to restrict access down to the level of certain attributes. The launcher configuration may be used to inform a launcher application of the master network manager 210 about the tailored configuration of the subordinate network manager 250.

As mentioned above, the subordinate network manager 250 provides only management applications required by the role(s) of the user. This may be achieved by implementing the subordinate network manager 250 with the mediation application 252 which communicates with the master network manager 210. Accordingly, the subordinate does not directly access the managed network 200. In the illustrated example, the subordinate network manager 250 is not equipped with its own launcher application or single-sign on applications. Rather, through the mediation application 252 the subordinate network manager 250 uses corresponding applications deployed in the master network manager 210.

It is noted that in the illustrated management system it is assumed that the master network manager 210 is responsible for all management transactions of the managed network 200 and otherwise configuring or modifying the managed network 200 is not possible.

Figure 3:
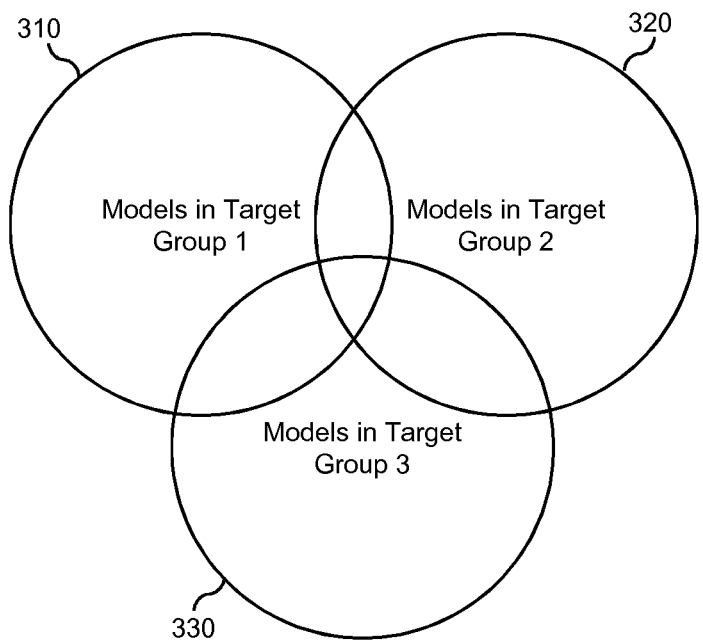
FIG. 3 schematically illustrates a scenario with overlapping resource models.
Figure 4:
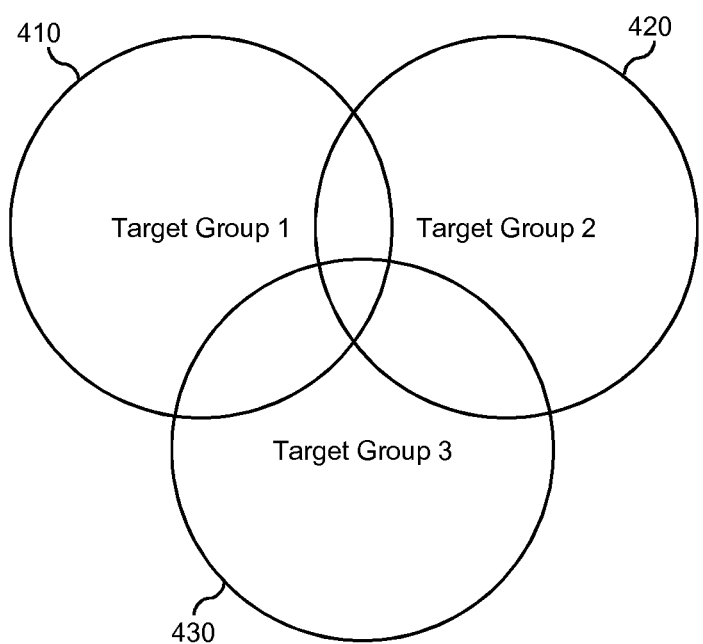
FIG. 4 schematically illustrates a scenario with overlapping access targets.

The replication of data in the subordinate network manager 250 can give rise to potential consistency issues and race conditions between different subordinate network managers. This is schematically illustrated by an overlap of target model groups 310, 320, 330 in FIG. 3 and by an overlap of target groups 410, 420, 430 in FIG. 4. In the scenario of FIG. 3, the target model group 310 could be associated with a first user using a first subordinate network manager, while the target model group 320 is associated with a second user using a second subordinate network manager and the target model group 330 is associated with a third user using a third subordinate network manager. In the scenario of FIG. 4, the target group 410 could be associated with a first user using a first subordinate network manager, while the target group 420 is associated with a second user using a second subordinate network manager and the target group 430 is associated with a third user using a third subordinate network manager. In overlap regions, data describing the target or target model may be used or replicated by multiple subordinate network managers, with the risk of conflicts or inconsistencies. Such conflicts can be mitigated by configuring the management applications to operate according to BASE (Basically Available, Soft state, Eventual) consistency principles. Further, such conflicts may be mitigated by denoting a critical intersection of data may be annotated as "not persistent" in the subordinate network manager. Accesses to this part of the data may then be handled directly by the master network manager 210. In other words, the subordinate network manager will directly read and writer data in the data repository 212 of the master network manager 210. The master network manager 210 may then apply ACID (Atomicity, Consistency, Isolation, Durability) principles to avoid conflicts.

Accordingly, the subordinate network manager 250 may be configured with functions which are tailored to the user's role(s) and management targets. In some scenarios only management targets which are authorized for the user's role are exposed. The user cannot initiate transactions with respect to other management targets. In some scenarios access to the complete managed network may be required.

However, the subordinate network manager 250 may be with only a limited set functions which are tailored to the user's role(s). Using the above-mentioned launcher configuration, the master network manager 210 may then provide the user with an application environment that has been tailored for that user/role.

In an exemplary use case, the management system may be used in the following manner for management of a multi-tenant network. In this use case, an operator of the multi-tenant network is referred to as provider operator, while an operator of a tenant network within the multi-tenant network is referred to as tenant operator. In the exemplary use case, the multi-tenant network may include network elements which are exclusive for the provider operator and shared network elements which may be used by the provider operator, the tenant operator, and possibly also other tenant operators.

The network functions may be virtualized, but also non-virtualized functions may be provided. In this scenario, the management system may be used by the provider operator and the tenant operator. In a service agreement, the provider operator and the tenant operator may specify an inventory of virtualized functions, an inventory of dedicated non-virtualized functions, shared functions, and management applications provided to the tenant operator. In accordance with these specifications, the master network manager may be used to define a new administrator role and an associated new target group. The dedicated non-virtualized functions and the shared functions are added to the target group. Policies relating to the number of instances of each virtual function type may be associated with the role. The role is also associated with a set of permitted management applications. The management system then configures the subordinate network manager 250 in accordance with the specified targets and role. This may involve creating a set of deployment instructions for the applications in the scope of the specified administrator role. Further, an administrator user of the subordinate network manager may be defined. An inventory database of the master network manager 210 may be pre-populated with connectivity details for the shared functions. The management system may further add security details required for the subordinate network manager 250 to access the shared functions in the master network manager 210. The management system may also create a new namespace for the tenant operator in the master network manager 210 to allow for provisioning of the virtualized functions. The subordinate network manager 250 may then be activated and thus be made available to the tenant operator.

After activation of the subordinate network manager 250, the administrator user may log in to the subordinate network manager 250. The administrator user may then define further users of the subordinate network manager 250. The administrator user or one of the further users may then use the subordinate network manager 250 and the management applications provided by the subordinate network manager 250 to instantiate the network slice. The instantiation of the network slice may include the instantiation of some virtual functions and also the configuration of the non-virtualized functions.

The instantiation of the networks slice may update the subordinate network manager 250 with information relating to the virtualized functions. Once instantiated, the data models representing the state of the virtualized functions may be created in the subordinate network manager 250.

In the case of a non-virtualized shared function, the master network manager 210 may be invoked as a proxy for managing the non-virtualized shared function. Here, the subordinate network manager 250 may use credentials which were provided by the master network manager when the subordinate network manager 250 was deployed. The master network manager 210 may then update its model of the shared function and propagate those changes to the shared function itself. The success of the change may then be reported to the subordinate network manager 250.

Figure 5:
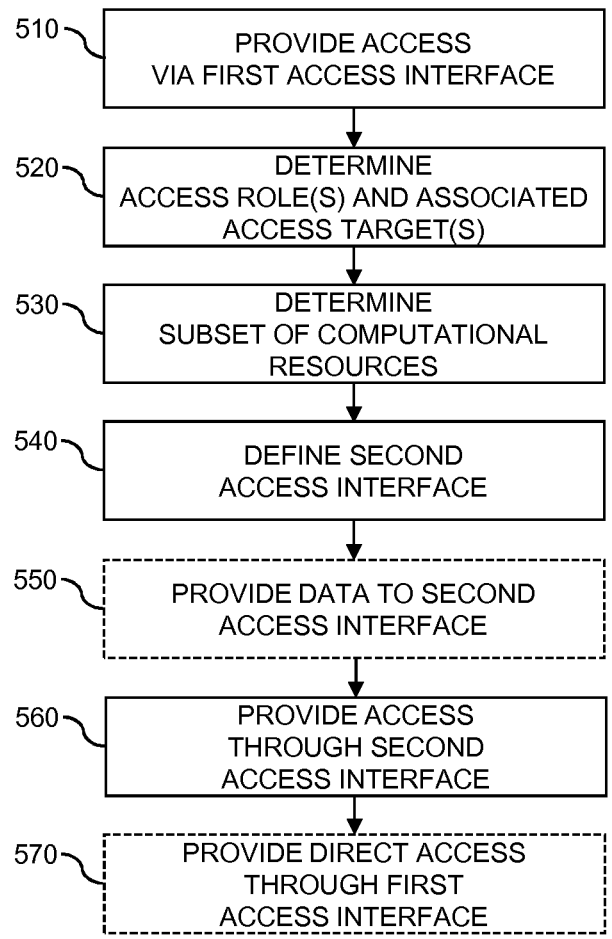
FIG. 5 shows a flowchart for schematically illustrating a method according to an embodiment of the invention.

FIG. 5 shows a flowchart for illustrating a method of controlling access to computational resources. The method of FIG. 5 may be utilized for implementing the illustrated concepts in an access manager, e.g., within a management system of a communications network. Accordingly, the computational resources may include network elements. If a processor-based implementation of the access manager is used, the steps of the method may be performed and/or controlled by one or more processors of a device implementing the access manager. Such device may also include a memory storing program code for implementing the below described functionalities or steps of the method.

At step 510, access to computational resources is provided through a first access interface, e.g., the above-mentioned master access interface. If the computational resources include network elements, the first access interface may include a set of management applications for managing the network elements.

At step 520, at least one access role of a user and at least one access target associated with the access role of the user are determined. A user can be an end user of a multi-user system, a tenant of a multi-tenant network, or the like.

At step 530, a subset of the computational resources is determined based on the at least one access role of the user and the associated at least one access target. The subset of the computational resources may be determined based on one or more access control policies.

At step 540, a second access interface is defined. The second access interface is defined to be limited to the subset of the computational resources. The second access interface may for example correspond to one of the above-mentioned first subordinate access interface 110 and second subordinate access interface 120. Defining of the second access interface may involve providing deployment instructions to a device providing the second access interface, such as to the above-mentioned subordinate network manager.

At step 550, the second access interface may be provided exclusively with data related to the subset of the computational resources. Accordingly, data which are not related to the subset of the computational resources are not exposed to the second access interface.

At step 560, the user is provided with access to the subset of computational resources through the second access interface. This may be accomplished by interaction of the second access interface with the first access interface. The first access interface may include a set of applications and the second access interface may be limited to a subset of the applications of the first access interface. If the computational resources include network elements, the first access interface may include a set of management applications for managing the network elements and the second access interface be limited to a subset of the management applications of the first access interface.

The steps 520, 530, 540, 550, and 560 may be implemented for each of multiple users. Accordingly, the method may also involve determining at least one access role of a further user and at least one access target associated with the access role of the further user, based on the at least one access role of the further user and the associated at least one access target, determining a further subset of the computational resources, defining a third access interface which is limited to the further subset of the computational resources, and providing the further user with access to the further subset of the computational resources through the third access interface.

For an overlapping part of the subset of the computational resources and the further subset of the computational resources transactions through the second access interface and the third access interface may be coordinated by the first access interface. This may be done by applying ACID principles for common data maintained by the first interface.

For an overlapping part of the subset of the computational resources and the further subset of the computational resources transactions through the second access interface and the third access interface may also be coordinated by providing consistency of data utilized by the second access interface with data utilized by the third access interface. This may be accomplished by applying BASE principles for local replicates of data maintained by the second access interface and the third access interface.

At step 570, the user may be provided with access to the computational resources through the first access interface. This may be accomplished based on the at least one access role of the user.

Figure 6:
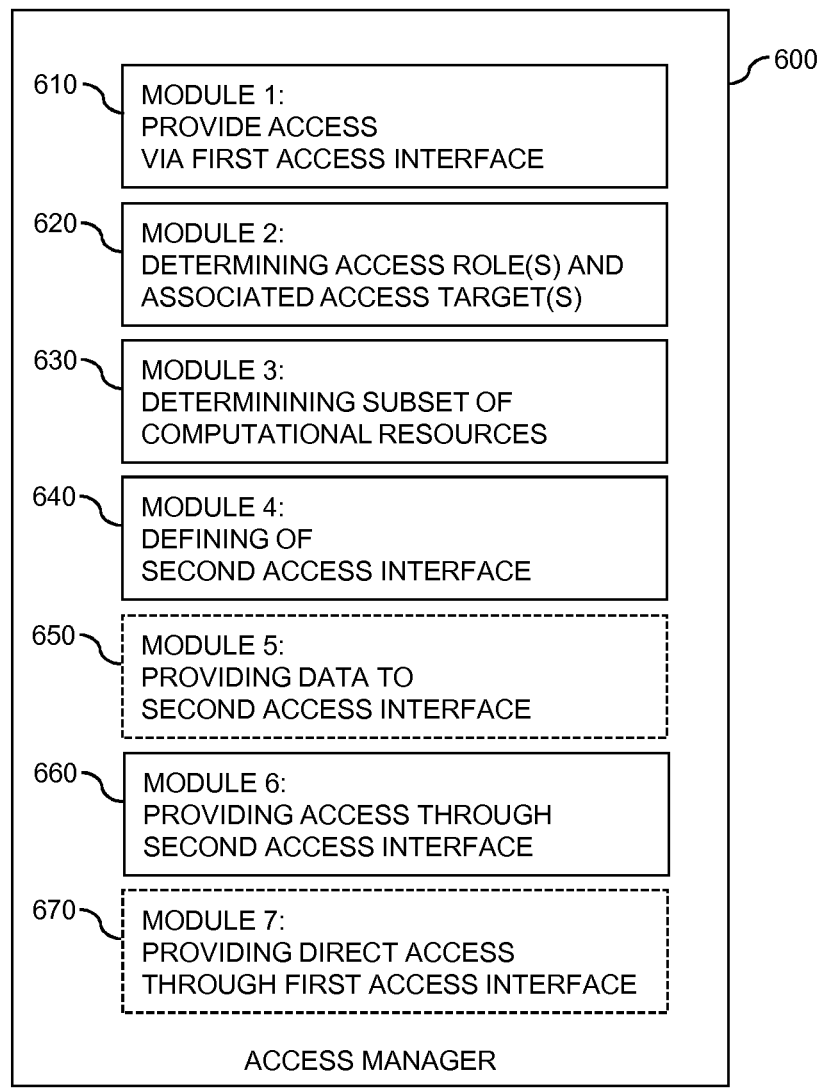
FIG. 6 shows a block diagram for illustrating functionalities of an access manager according to an embodiment of the invention.

FIG. 6 shows a block diagram for illustrating functionalities of an access manager 600 which operates according to the method of FIG. 5. As illustrated, the access manager 600 may be provided with a module 610 configured to provide access through a first access interface, such as explained in connection with step 510 of FIG. 5. Further, the access manager 600 may be provided with a module 620 configured to determine one or more access roles and one or more associated access targets, such as explained in connection with step 520 of FIG. 5. Further, the access manager 600 may be provided with a module 630 configured to determine a subset of the computational resources, such as explained in connection with step 530 of FIG. 5. Further, the access manager 600 may be provided with a module 640 configured to define a second access interface, such as explained in connection with step 540 of FIG. 5. Further, the access manager 600 may optionally be provided with a module 650 configured to provide data to the second access interface, such as explained in connection with step 550 of FIG. 5. Further, the access manager 600 may be provided with a module 660 configured to provide the user is provided with access to the subset of computational resources through the second access interface, such as explained in connection with step 560 of FIG. 5. Further, the access manager 600 may optionally be provided with a module 670 configured to provide the user with direct access to the computational resources through the first access interface, such as explained in connection with step 570 of FIG. 5.

It is noted that the access manager 600 may include further modules for implementing other functionalities, such as known functionalities of an access control system or management system. Further, it is noted that the modules of the access manager 600 do not necessarily represent a hardware structure of the access manager 600, but may also correspond to functional elements, e.g., implemented by hardware, software, or a combination thereof.

Figure 7:
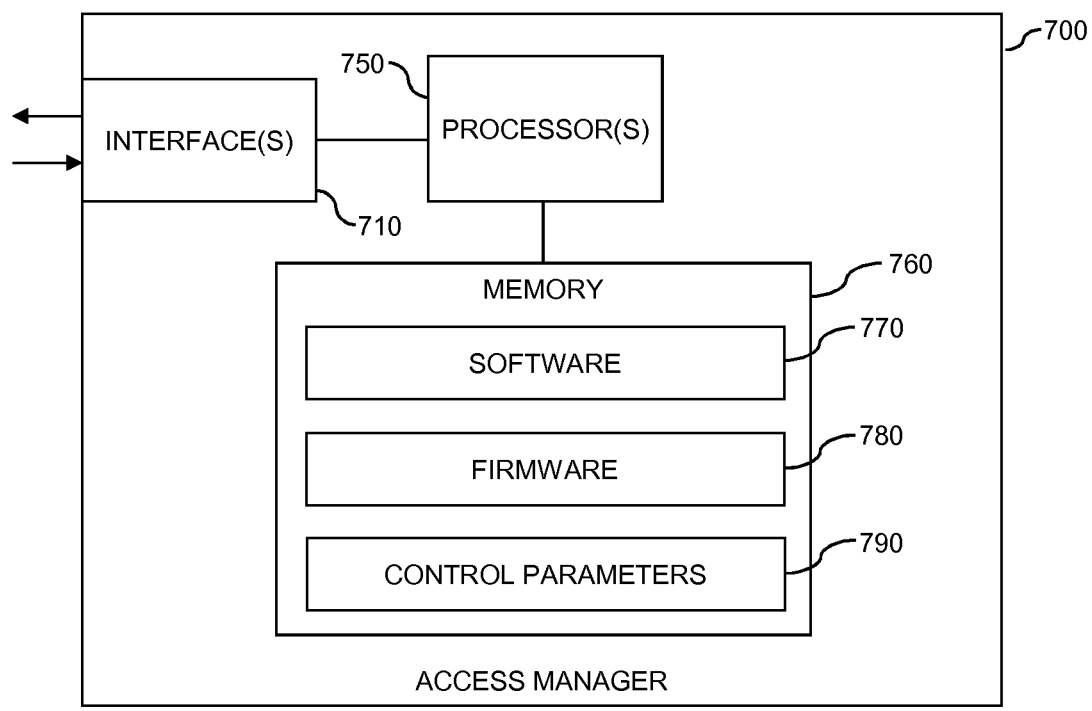
FIG. 7 schematically illustrates structures of an access manager according to an embodiment of the invention.

FIG. 7 illustrates a processor-based implementation of an access manager 700 which may be used for implementing the above described concepts. For example, the structures as illustrated in FIG. 7 may be used for implementing the master network manager 210, the subordinate network manager 250, or the access manager 600.

As illustrated, the access manager 700 may include one or more interfaces 710 for communicating other nodes. The interface(s) 710 may for example be used for communication between the above-mentioned master network manager 210 and subordinate network manager 250, if these are implemented by separate devices.

Further, the access manager 700 may include one or more processors 750 coupled to the interface(s) 810, and a memory 760 coupled to the processor(s) 750. By way of example, the interface(s) 710, the processor(s) 750, and the memory 760 could be coupled by one or more internal bus systems of the access manager 700. The memory 760 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 760 may include software 770, firmware 780, and/or control parameters 790. The memory 760 may include suitably configured program code to be executed by the processor(s) 750 so as to implement the above-described functionalities of an access manager, such as explained in connection with FIG. 5.

It is to be understood that the structures as illustrated in FIG. 7 are merely schematic and that the access manager 700 may actually include further components which, for the sake of clarity, have not been illustrated, e.g., further interfaces or processors. Also, it is to be understood that the memory 760 may include further program code for implementing known functionalities of an access control system or management system. According to some embodiments, also a computer program may be provided for implementing functionalities of the access manager 700, e.g., in the form of a physical medium storing the program code and/or other data to be stored in the memory 760 or by making the program code available for download or by streaming.

As can be seen, the concepts as described above may be used for efficiently controlling access to computational resources. In particular, a subordinate access interface may be provided which is tailored to an access role and access targets of a user. Further, TBAC based principles can be implemented without compromising performance. Further, the concepts may be applied in connection with various types of data repositories. Still further, the access control mechanisms of the illustrated concepts can be implemented in a consistent manner for various types of services.

It is to be understood that the examples and embodiments as explained above are merely illustrative and susceptible to various modifications. For example, the illustrated concepts may be applied in connection with various kinds of computer systems or network technologies, without limitation to the above-mentioned example of a multi-tenant communication networks. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method performed by an access manager of controlling access to network elements, the access manager comprising a first access interface for providing access to network elements via one or more second access interfaces that are subordinate to the first access interface, the method comprising:

providing access to network elements via the first access interface;

upon a user accessing the first access interface, determining at least one access role of the user and at least one access target associated with the access role of the user;

based on the at least one access role of the user and the associated at least one access target, determining a subset of the network elements;

defining a second access interface which is limited to the subset of the network elements; and through the second access interface, providing the user with access to the subset of network elements, wherein the user is provided with access to the subset of the network elements by interaction of the second access interface with the first access interface.

2. The method according to claim 1, wherein the first access interface comprises a set of applications and the second access interface is limited to a subset of the applications of the first access interface.

3. The method according to claim 1, wherein the first access interface comprises a set of management applications for managing the network elements and the second access interface is limited to a subset of the management applications of the first access interface.

4. The method according to claim 1, comprising: providing the second access interface exclusively with data related to the subset of the network elements.

5. The method according to claim 1, comprising: determining the subset of the network elements based on one or more access control policies.

6. The method according to claim 1 comprising:
determining at least one access role of a further user and at least one access target associated with the access role of the further user;
based on the at least one access role of the further user and the associated at least one access target, determining a further subset of the network elements;
defining a third access interface which is limited to the further subset of the network elements; and
through the third access interface, providing the further user with access to the further subset of the network elements.

7. The method according to claim 6, wherein for an overlapping part of the subset of the network elements and the further subset of the network elements transactions through the second access interface and the third access interface are coordinated by the first access interface.

8. The method according to claim 6, wherein for an overlapping part of the subset of the network elements and the further subset of the network elements transactions through the second access interface and the third access interface are coordinated by providing consistency of data utilized by the second access interface with data utilized by the third access interface.

9. A device for controlling access to network elements, the device comprising:
at least one processor and a memory containing instructions executable by said at least one processor whereby said device is operative to:
through a first access interface, provide access to network elements;
upon a user accessing the first access interface, determine at least one access role of the user and at least one access target associated with the access role of the user;
based on the at least one access role of the user and the associated at least one access target, determine a subset of the network elements;
define a second access interface which is limited to the subset of network elements; and
through the second access interface, provide the user with access to the subset of the network elements, wherein the user is provided with access to the subset of the network elements by interaction of the second access interface with the first access interface.

10. The device according to claim 9, wherein the first access interface comprises a set of applications and the second access interface is limited to a subset of the applications of the first access interface.

11. The device according to claim 9, wherein the first access interface comprises a set of management applications for managing the network elements and the second access interface is limited to a subset of the management applications of the first access interface.

12. The device according to claim 9, whereby said device is further operative to provide the second access interface exclusively with data related to the subset of the network elements.

13. The device according to claim 9 whereby said device is further operative to determine the subset of the network elements based on one or more access control policies.

14. The device according to claim 9, whereby said device is further operative to:
determine at least one access role of a further user and at least one access target associated with the access role of the further user;
based on the at least one access role of the further user and the associated at least one access target, determine a further subset of the network elements;
define a third access interface which is limited to the further subset of the network elements; and
through the third access interface, provide the further user with access to the further subset of the network elements.

15. The device according to claim 14, wherein for an overlapping part of the subset of the network elements and the further subset of the network elements transactions through the second access interface and the third access interface are coordinated by the first access interface.

16. The device according to claim 14, wherein for an overlapping part of the subset of the network elements and the further subset of the network elements transactions through the second access interface and the third access interface are coordinated by providing consistency of data utilized by the second access interface with data utilized by the third access interface.

17. A system, comprising:
an access manager comprising a first access interface and at least one processor and a memory containing instructions executable by the at least one processor; and
a device comprising a second access interface and at least one processor and a memory containing instructions executable by the at least one processor;
wherein the access manager is operable to:
provide access to network elements via the first access interface;
upon a user accessing the first access interface, determine at least one access role of the user and at least one access target associated with the access role of the user;
based on the at least one access role of the user and the associated at least one access target, determine a subset of the network elements;

define the second access interface which is limited to the subset of network elements; and through the second access interface, provide the user with access to the subset of network elements, wherein the user is provided with access to the subset of the network elements by interaction of the second access interface with the first access interface.

18. The system according to claim 17, wherein the first access interface comprises a set of applications and the second access interface is limited to a subset of the applications of the first access interface.

\* \* \* \* \*